(12) United States Patent
Furutani

(10) Patent No.: US 8,711,394 B2
(45) Date of Patent: Apr. 29, 2014

(54) IMAGE FORMING APPARATUS FORMING IMAGES IN RESPONSE TO IMAGE FORMATION REQUEST FROM OPERATION UNIT OR EXTERNAL DEVICE

(75) Inventor: Hiroshi Furutani, Higashiosaka (JP)

(73) Assignee: KYOCERA Document Solutions Inc., Chuo-ku, Osaka (JP)

( * ) Notice: Subject to any disclaimer, the term of this patent is extended or adjusted under 35 U.S.C. 154(b) by 1102 days.

(21) Appl. No.: 12/134,048

(22) Filed: Jun. 5, 2008

(65) Prior Publication Data

US 2008/0304103 A1    Dec. 11, 2008

(30) Foreign Application Priority Data

Jun. 5, 2007  (JP) ................................. 2007-149423

(51) Int. Cl.
*G06F 3/12*    (2006.01)
(52) U.S. Cl.
USPC .......... 358/1.15; 323/318; 358/413; 358/435; 358/443; 358/468; 358/491
(58) Field of Classification Search
CPC .......... H04N 1/00063; H04N 1/00082; H04N 1/00085–1/00904
USPC ................................................ 358/1.1–3.23
See application file for complete search history.

(56) References Cited

U.S. PATENT DOCUMENTS

| 2002/0131802 A1* | 9/2002 | Shimizu et al. ................ 399/405 |
| 2002/0198987 A1* | 12/2002 | Fukazawa et al. ............ 709/224 |
| 2004/0175200 A1* | 9/2004 | Namura .......................... 399/88 |
| 2005/0057778 A1* | 3/2005 | Morikawa et al. ............ 358/296 |
| 2005/0111865 A1* | 5/2005 | Kubota ............................ 399/70 |
| 2005/0179935 A1* | 8/2005 | Ogura et al. ................. 358/1.14 |

FOREIGN PATENT DOCUMENTS

JP    2005-70628    3/2005

* cited by examiner

*Primary Examiner* — Benny Q Tieu
*Assistant Examiner* — Marcellus Augustin
(74) *Attorney, Agent, or Firm* — Ditthavong Mori & Steiner, P.C.

(57) ABSTRACT

A multifunctional printer 10 comprises an operation unit 13 making image formation requests, an image forming unit 16 forming an image in response to an image formation request issued from the operation unit 13 or an external device, a determination unit determining whether the image formation request is issued from the operation unit 13 or the external device, a main power source 23 activating the operation unit 13 and image forming unit 16 to bring them into a usable state, and a control unit actuating the image forming unit 16, when the main power source 23 completely activates the image forming unit 16 and the determination unit determines that the image formation request is a request issued from the external device, regardless of whether the operation unit 13 is activated or not.

11 Claims, 4 Drawing Sheets

IMAGE FORMING APPARATUS FORMING IMAGES IN RESPONSE TO IMAGE FORMATION REQUEST FROM OPERATION UNIT OR EXTERNAL DEVICE

BACKGROUND OF THE INVENTION

1. Field of the invention

The present invention relates to an image forming apparatus, and more particularly, to an image forming apparatus having a plurality of functions.

2. Description of Background Art

An image forming apparatus is typically equipped with various functions, such as a scan function and a copy function. As for forming an image with the copy function, a user first turns a main power source on to activate the image forming apparatus. Upon completion of the activation of the image forming apparatus, a start key on an operation unit for mainly providing requests as to image formation is pressed down to start forming the image.

Generally, the completion of the activation of the image forming apparatus depends on the warm-up time of a fixing device provided in the image forming apparatus. In other words, the user has to wait until the fixing device reaches a predetermined fixable temperature after the main power source is turned on.

A technique to cut the time required for the fixing device to reach the predetermined fixable temperature after turning the main power source on for the purpose of reducing the activation time of the image forming apparatus is disclosed in Japanese unexamined patent publication No. 2005-70628.

Powering the main power source of the image forming apparatus activates respective units, including an operation unit for mainly requesting image formation, an image reading unit for reading originals and an image forming unit including the fixing device. The full activation of every unit brings the image forming apparatus into a usable state. Some current image forming apparatuses that need to load multiple functions and to display the functions on their operation units take a longer time required to complete the activation of the operation unit.

On the other hand, as for forming an image with a print function, for example, a user makes a request for forming an image from a personal computer, which is connected to the image forming apparatus, through a network without using the operation unit. Even in this case, however, in which the image formation request is issued from an external device of the image forming apparatus, the image cannot be formed until the activation of all units, including the operation unit, of the image forming apparatus is completed. As this goes to publication No. 2005-70628, even if the activation time of the fixing device is reduced, the user cannot get images until the activation of all other units is completed.

SUMMARY OF THE INVENTION

The present invention has an object to provide an image forming apparatus with improved convenience in meeting image formation requests issued from external devices.

The image forming apparatus according to the present invention comprises: an operation unit making image formation requests; an image forming unit forming an image in response to an image formation request issued from the operation unit or an external device; a determination unit determining whether the image formation request is a request issued from the operation unit or the external device; an activation unit activating the operation unit and the image forming unit to bring the units into a usable state; and a control unit actuating the image forming unit, when the activation unit completely activates the image forming unit and the determination unit determines that the image formation request is a request issued from the external device, regardless of whether the operation unit is activated or not.

According to the invention, when the image forming unit for forming an image in response to an image formation request is completely activated and then an image formation request is issued from the external device of the image forming apparatus, the image can be formed regardless of whether the operation unit is activated or not. Therefore, as long as the image forming unit is completely activated, users can form an image in response to the image formation request issued from the external device of the image forming apparatus even if the activation process of the operation unit is not completed. Thus, the image formation request issued from the external device of the image forming apparatus can be executed in a more convenient manner.

Preferably, the image forming apparatus is connected to a network, and the determination unit is a print determination unit determining that the request from a personal computer connected through the network to the image forming apparatus is a request from the external device.

The image forming apparatus is connected to a telephone line, and the determination unit is a FAX reception determination unit determining that the request issued through the telephone line from a facsimile connected to the image forming apparatus is a request from the external device.

The image forming apparatus is connected to a telephone line, and the determination unit is a FAX transmission determination unit determining that the request through the telephone line to a facsimile connected to the image forming apparatus is a request from the operation unit.

The determination unit is a copy determination unit determining that a request to copy an image is a request from the operation unit.

More preferably, the activation unit is comprised of a first power source activating the operation unit and a second power source separately provided from the first power source and activating the image forming unit.

More preferably, the image forming unit includes a fixing device fixing the formed image on paper, and the control unit includes a detection unit detecting the completion of the activation of the image forming unit when the activation of the fixing device is completed.

More preferably, the operation unit is a setting display unit displaying a plurality of screens on which image forming conditions are set.

More preferably, the operation unit is a file display unit loading and displaying an HTML (Hyper Text Markup Language) formatted file.

In another aspect of the present invention, an image forming system includes an image forming apparatus that forms an image in response to a request and an external device making image formation requests to the image forming apparatus. The image forming apparatus comprises: an operation unit making image formation requests; an image forming unit forming an image in response to an image formation request issued from the operation unit or the external device; a determination unit determining whether the image formation request is a request issued from the operation unit or the external device; an activation unit activating the operation unit and the image forming unit to bring the units into a usable state; and a control unit actuating the image forming unit, when the activation unit completely activates the image forming unit and the determination unit determines that the image formation request is a request issued from the external device, regardless of whether the operation unit is activated or not.

Preferably, the external device is a computer connected to the image forming apparatus through a network.

The external device is a facsimile connected to the image forming apparatus through a telephone line.

In yet another aspect of the present invention, a method for forming images with an image forming apparatus, which includes an operation unit making image formation requests and an image forming unit forming an image in response to an image formation request issued from the operation unit or an external device, comprises: determining whether the image formation request is a request issued from the operation unit or the external device; activating the operation unit and image forming unit to bring the units into a usable state; and actuating the image forming unit, when the activation of the image forming unit is completed and the image formation request is determined to be a request issued from the external device, regardless of whether the operation unit is activated or not.

DESCRIPTION OF PREFERRED EMBODIMENT

Figure 1:
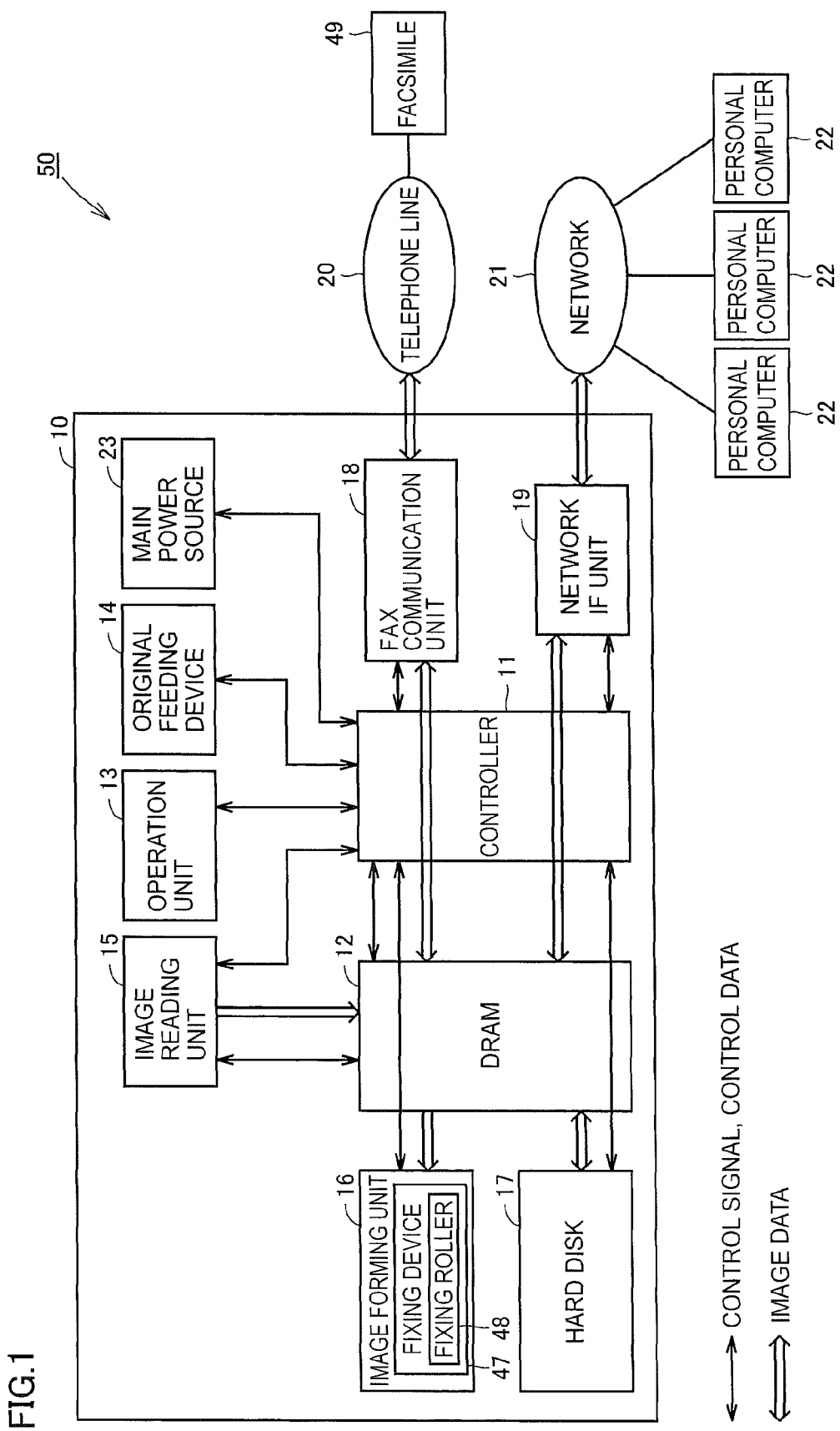
FIG. 1 is a block diagram illustrating the entire structure of an image forming system and a multifunctional printer included in the image forming system according to an embodiment of the present invention.

Embodiments of the present invention will be now described below with reference to the drawings. FIG. 1 is a block diagram illustrating the structure of an image forming system according to an embodiment of the invention and a multifunctional printer 10 that is used as an image forming apparatus in the image forming system. Referring to FIG. 1, the image forming system 50 includes the multifunctional printer 10, personal computers (computers) 22, which are external devices of the multifunctional printer 10, and a facsimile 49, which is an external device of the multifunctional printer 10.

The multifunctional printer 10 comprises a controller 11 that controls the entire multifunctional printer 10, a DRAM 12 where image data and other data are written in and read out from, an operation unit 13 that displays information in the multifunctional printer 10 and serves as an interface between the multifunctional printer 10 and users, an original feeding device 14 that automatically transfers originals to a predetermined original reading position, an image reading unit 15 that reads the images of the originals, each of which was transferred by the original feeding device 14 and is situated on the predetermined original reading position, using a scanner, an image forming unit 16 that forms images of the originals read by the image reading unit 15, a hard disk 17 that stores the image data and other data, a FAX communication unit 18 connected to a telephone line 20, a network IF (interface) unit 19 used to connect with a network 21, and a main power source 23 that supplies electric power to the above-mentioned operation unit 13, image reading unit 15, image forming unit 16 and other units to activate them.

The personal computers 22 are connected through the network 21 to the multifunctional printer 10. The facsimile 49 is connected through the telephone line 20 to the multifunctional printer 10. The personal computers 22 send requests, to the multifunctional printer 10, for forming images using a print function, which will be described later, of the multifunctional printer 10. The facsimile 49 sends requests, to the multifunctional printer 10, for forming images using a facsimile function, which will be described later, of the multifunctional printer 10, while receiving image formation requests from the multifunctional printer 10. The multifunctional printer 10 receives image formation requests from the personal computers 22 and facsimile 49, while sending image formation requests to the facsimile 49.

The image forming unit 16 includes a developing device (not shown) that supplies developer onto electrostatic latent images formed on a photoreceptor to make the latent images into visible images, and a fixing device 47 that fixes the formed visible images on paper. The fixing device 47 includes a fixing roller 48 for heating toner to fix it on the paper. To form an image, the fixing roller 48 is heated to a fixing temperature, for example approximately 160° C., by a heater (not shown) built in the fixing roller 48. Since, in components constituting the image forming unit 16, the fixing roller 48 generally takes the longest time to raise its temperature to complete the activation, the completion of the activation of the image forming unit 16 is determined by detecting the completion of the activation of the fixing device 47.

The controller 11 compresses and encodes original data fed by the image reading unit 15 to write the compressed encoded original data in the DRAM 12, while reading out the written data in the DRAM 12 and decompressing and decoding the data to output from the image forming unit 16.

The multifunctional printer 10 operating as a copying machine forms images in the image forming unit 16 using original documents which are read by the image reader 15 and sent through the DRAM 12. The multifunctional printer 10 operating as a printer forms images in the image forming unit 16 using image data which is transmitted from the personal computers 22 connected to the network 21 through the network IF unit 19 and the DRAM 12. The multifunctional printer 10 operating as a facsimile machine forms images in the image forming unit 16 using image data transmitted from the telephone line 20 through the FAX communications unit 18 and the DRAM 12, while transmitting original image data, which is read by the image reader 15, through the DRAM 12 and the FAX communications unit 18 to the telephone line 20. In summary, the multifunctional printer 10 has a plurality of image processing functions such as a reproduction (copy) function, a print function and a facsimile function. In addition to these functions, the multifunctional printer 10 has a function of setting each of the functions in detail.

In FIG. 1, double-line arrows indicate flows of image data, while thin-line arrows indicate flows of control signals or control data.

Figure 2:
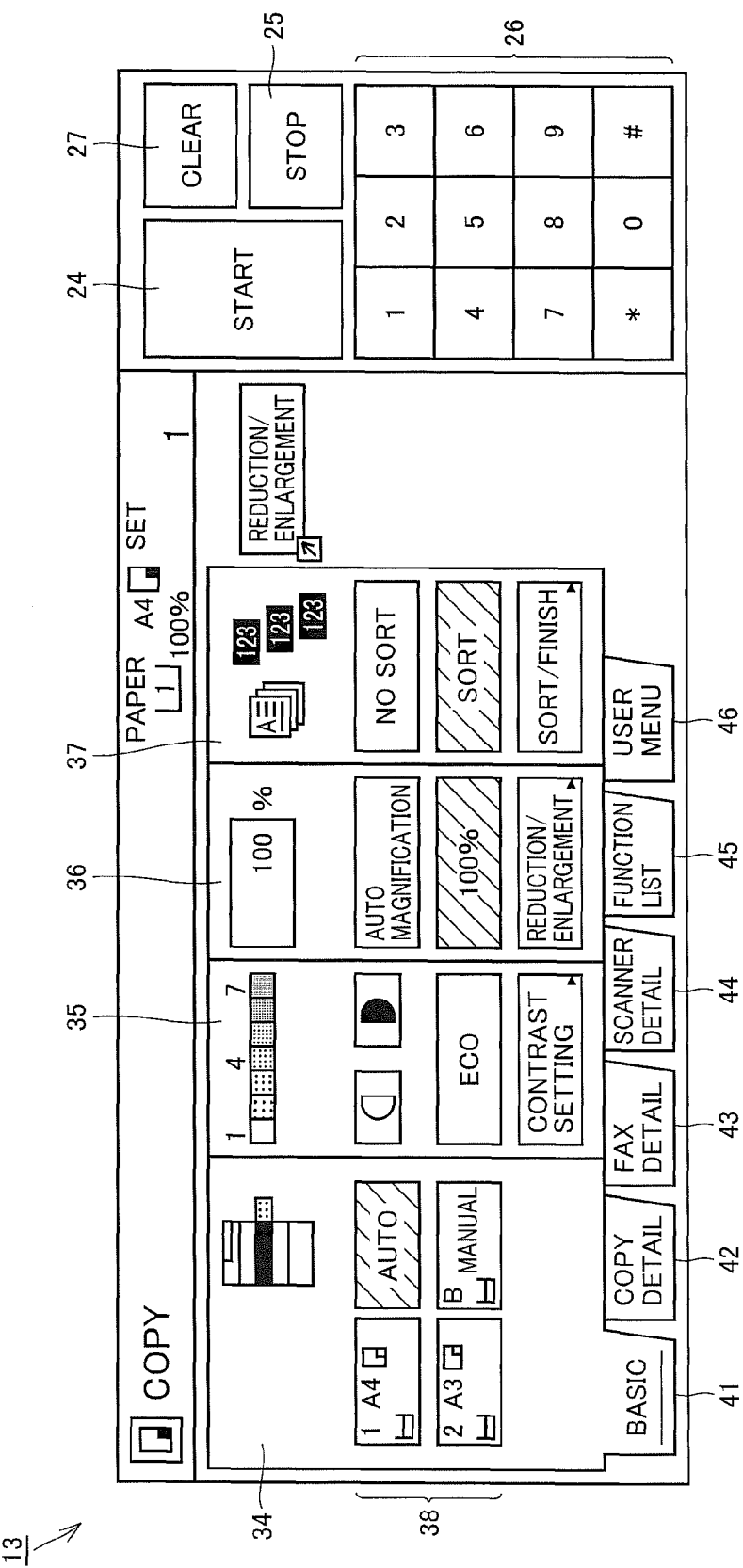
FIG. 2 illustrates an exemplary operation unit provided in the multifunctional printer.

A detailed description will be now made for the operation unit 13. FIG. 2 illustrates an exemplary operation unit 13 provided in the multifunctional printer 10. Referring to FIGS. 1 and 2, the operation unit 13 employs a touch panel technique. The operation unit 13 includes a start key 24 for making requests to start forming images to the multifunctional printer 10, a stop key 25 for providing instructions to abort processes to the multifunctional printer 10, number input keys 26 for setting the number of images to be formed or the like, a clear key 27 for restoring the set image forming conditions to the defaults, and a plurality of setting tabs 41 to 46 that are displayed in a tab form to indicate specific image forming conditions and so on.

The setting tabs 41 to 46 include a setting tab 41 for setting basic image forming conditions, a setting tab 42 for setting detailed image forming conditions to perform the copy function, a setting tab 43 for setting detailed image forming conditions to perform the facsimile function, a setting tab 44 for setting detailed image forming conditions to perform the scan function, a setting tab 45 for displaying a list of image forming conditions provided in the multifunctional printer 10, and a setting tab 46 for selectively displaying image forming conditions frequently used by users. A total of six screens are represented in the setting tabs 41 to 46. The users can display desired image forming conditions on the operation unit 13 by switching the setting tabs 41 to 46.

The setting tab 41 for setting the basic image forming conditions includes a setting section 34 for setting size of paper to be output, a setting section 35 for setting contrast of the image to be output, a setting section 36 for scaling the image to be output, and a setting section 37 for sorting the output paper. Similarly, each of the setting tabs 42 to 46 has setting sections 34 to 37 for setting a plurality of specific image forming conditions.

The setting section 34 for setting size of the paper to be output contains a plurality of detailed setting keys 38 for specifically setting size of the paper. Similarly, each of the setting sections 35 to 37 contains a plurality of detailed setting keys 38 for selecting specific settings. The users can input image forming conditions by pressing the above-mentioned start key 24, stop key 25, number input keys 26, clear key 27 and detailed setting keys 38. The operation unit 13 now is a setting display unit that displays a plurality of display screens used to set the image forming conditions.

The operation unit 13 is configured to load a file in which information of the above-mentioned start key 24, stop key 25, number input keys 26, clear key 27, detailed setting keys 38, setting tabs 41 to 46 and setting sections 34 to 37 is written in HTML format to display the information. Because of this, the operation unit 13 is required to read all display data from the hard disk 17 before displaying the image forming conditions. The operation unit 13 now operates as a file display unit that loads and displays the HTML formatted file. It may take a long time for the operation unit 13 to load all the display data. In this case, the activation time of the operation unit 13 may be longer than the activation time of the image forming unit 16 or image reading unit 15.

Figure 3:
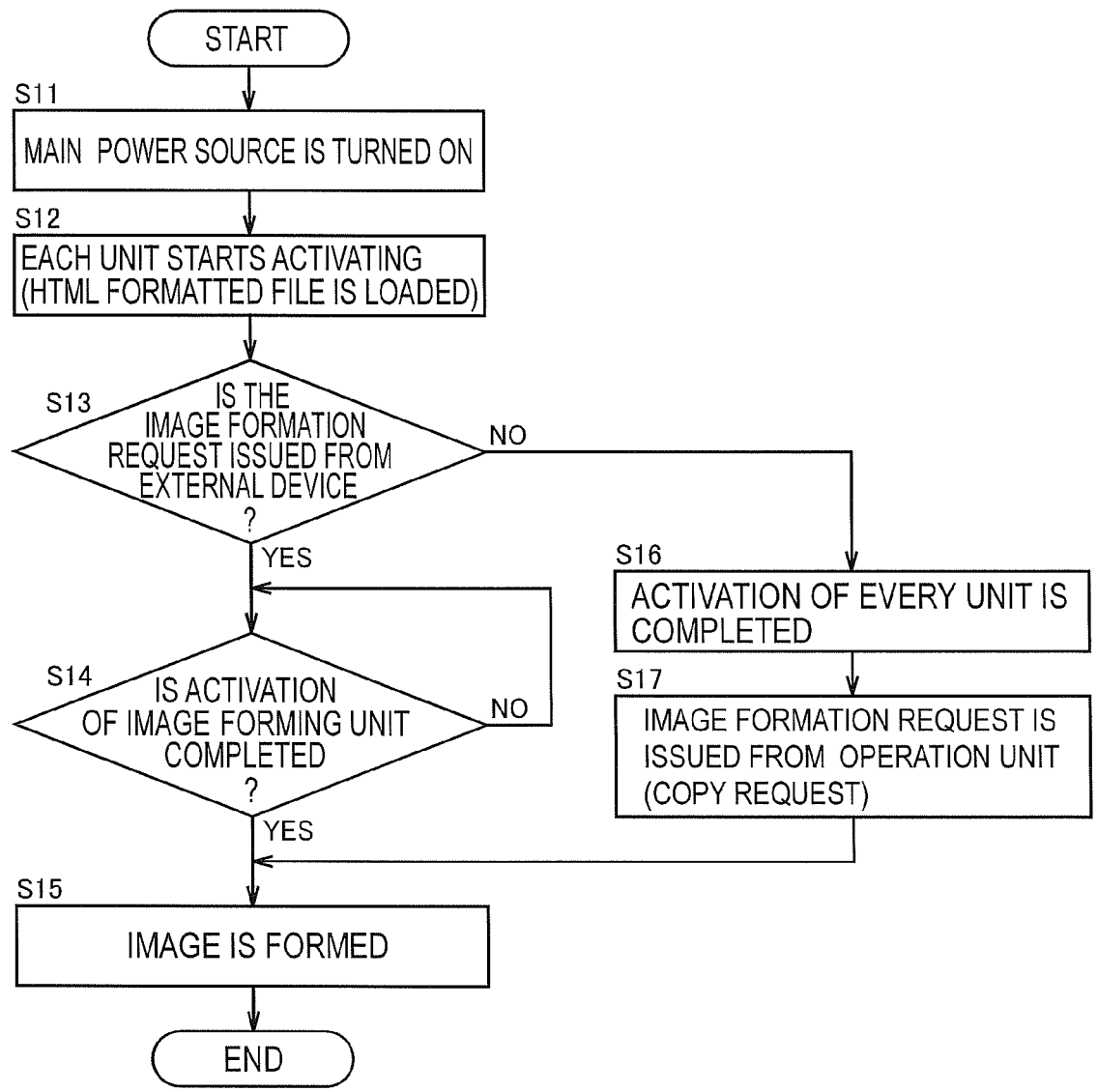
FIG. 3 is a flow chart showing a procedure for a user to form an image using the multifunctional printer.

Next, a description will be made about image formation performed by a user with the multifunctional printer 10. FIG. 3 is a flow chart showing an image formation procedure performed by the user with the multifunctional printer 10. Referring to FIGS. 1 to 3, the user forms an image using the print function of the multifunctional printer 10.

First, the user turns on the main power source 23 of the multifunctional printer 10 (step S11 in FIG. 3, hereinafter "step" is omitted). This supplies electric power to the operation unit 13, image forming unit 16 and other components of the multifunctional printer 10 to start their activation (S12). Specifically, an HTML formatted file is loaded on the operation unit 13. The main power source 23 and controller 11 now operate as an activation unit.

Then, the user transmits image data from a personal computer 22, which is an external device connected to the network 21, in other words, from the outside of the multifunctional printer 10 to the multifunctional printer 10 to make a request to form an image. The controller 11 determines whether the image formation request is issued from the external device of the multifunctional printer 10 or not (S13). Now, the controller 11 operates as a determination unit. Specifically, the determination unit now is a print determination unit determining that the request from the personal computer 22 connected to the multifunctional printer 10 through the network 21 is a request issued from the external device of the multifunctional printer 10. Since the print function is performed with an image formation request issued from the external device of the multifunctional printer 10 (YES in S13), the controller 11 then determines whether the image forming unit 16 is completely activated (S14). In the case where the activation of the image forming unit 16 is completed (YES in S14), that is, where the image forming unit 16 is in a usable state, and more specifically, where a detection unit in the controller 11 detects that the activation of the fixing device 47 is completed, the controller 11 actuates the image forming unit 16 to form the image (S15).

As described above, if the activation of the image forming unit 16 for forming an images in response to an image formation request is completed and if an image formation request is issued from the external device of the multifunctional printer 10, the image can be formed regardless of whether the activation of the operation unit 13 is completed or not. As long as the activation of the image forming unit 16 is completed, the user can get the image with the image formation request issued from the external device of the multifunctional printer 10 without waiting for the operation unit 13 to be completely activated. Thus, the image formation request issued from the external device of the multifunctional printer 10 can be executed in a more convenient manner.

Next, a description will be made about image formation by a user using the copy function of the multifunctional printer 10. Steps from S11 to S12 are performed as is the case with the above-described image formation using the print function and their descriptions will not be reiterated here. In S13, it is determined that the image formation request using the copy function is not a request issued from the external device of the multifunctional printer 10 (NO in S13). Then, the activation of the operation unit 13, image forming unit 16 and other components is completed (S16). After the operation unit 13 enters the usable state as shown in FIG. 2, the user presses the start key 24 to provide a request to form the image (S17). Accordingly, the controller 11 actuates the image forming unit 16 to form the image in response to the image formation request from the operation unit 13 (S15). Now, the determination unit of the controller 11 is a copy determination unit determining that the request to copy the image is a request issued from the operation unit 13.

Figure 4:
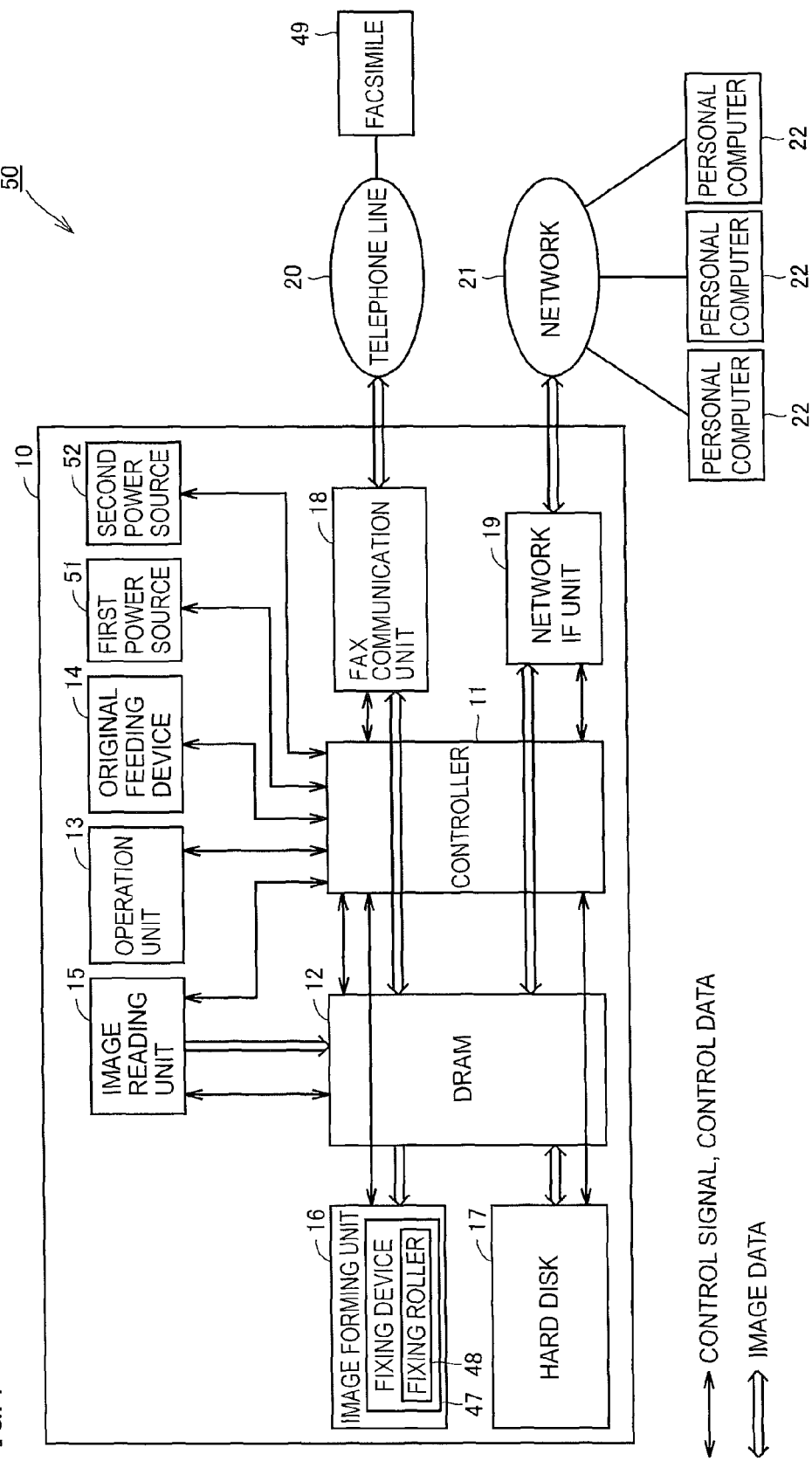
FIG. 4 is a block diagram illustrating the entire structure of an image forming system and the multifunctional printer included in the image forming system according to another embodiment of the present invention.

In the above embodiment, the operation unit 13 and image forming unit 16 in the multifunctional printer 10 are activated by powering the main power source 23 provided in the multifunctional printer 10; however, it is possible to provide a first power source that activates the operation unit 13 and a second power source that is separately provided from the first power source and activates the image forming unit 16. Specifically, as shown in FIG. 4, the multifunctional printer 10 comprises a first power source 51 that activates the operation unit 13 and a second power source 52 that is separately provided from the first power source 51 and activates the image forming unit 16. This allows the user who makes an image formation request using the external device of the multifunctional printer 10 to give a higher priority to the second power source 52 to be powered for the purpose of activating the image forming unit 16 and therefore to effectively form the image.

In addition, when the multifunctional printer 10 with the first power source 51 for activating the operation unit 13 and the second power source 52 for activating the image forming unit 16 receives an image formation request issued from the external device, the first power source 51 is not needed to be turned on. This can reduce power consumption required for image formation.

Although, in the above embodiments, the image formation is performed using the print function of the multifunctional printer 10, the present invention is not limited thereto, and can be also applied to image formation using a FAX reception function of the multifunctional printer 10. Specifically, image data is transmitted through the telephone line 20 from a facsimile 49 connected to the multifunctional printer 10, and the multifunctional printer 10 regards the transmission of the image data as an image formation request issued from the external device and forms the image. The determination unit now is a FAX reception determination unit determining that the request issued through the telephone line 20 from the facsimile 49 connected to the multifunctional printer 10 is a request issued from the external device. In addition, the determination unit can be a FAX transmission determination unit determining that the request issued through the telephone line 20 to the facsimile 49 connected to the multifunctional printer 10 is a request issued from the operation unit 13.

Although, in the above embodiments, the completion of the activation of the image forming unit is determined by detecting the completion of the activation of the fixing device, the present invention is not limited thereto and the completion of the activation of image forming unit can be determined by detecting the completion of the activation of other components. If the developing device included in the image forming unit takes the longest time to be activated among the components constituting the image forming unit, for example, the completion of the activation of the developing device can be regarded as the completion of the activation of the image forming unit.

Although, in the above embodiments, the operation unit loads an HTML formatted file during its activation, the present invention is not limited thereto, and other formatted files, such as an XML formatted file, can be loaded to activate the operation unit.

The foregoing has described the embodiments of the present invention by referring to the drawings. However, the invention should not be limited to the illustrated embodiments. It should be appreciated that various modifications and changes can be made to the illustrated embodiments within the scope of the appended claims and their equivalents.

What is claimed is:

1. An image forming apparatus comprising:
   an operation unit configured to load a file, written in HTML format, from a hard disk, display information including multiple functions based on said loaded file in a usable state, and make image formation requests according to instructions from a user;
   an image forming unit forming an image in response to an image formation request issued from said operation unit or an external device;
   an activation unit for starting supplying electric power to both said operation unit and said image forming unit in parallel by turning on a main power, to activate said operation unit and said image forming unit to bring the units into the usable state, so that both a first image processing function which needs an operation with said operation unit, having at least a copy function, and a second image proccessing function which needs no operation with said operation unit, having a printer function, can be performed, wherein an activation time, representing time required from starting receiving electric power to the usable state, of said operation unit is longer than an activation time of said image forming unit on one or more occasions;
   a determination unit determining, when said image formation request is issued while said activation unit activates both said operation unit and said image forming unit in parallel, after turning on said main power, whether said image formation request is issued from said external device or not; and
   a control unit making said image forming unit form the image by operating said second image processing function, before said operation unit is brought into the usable state, based on said image formation request from said external device when said control unit detects that said image forming unit has been brought into the usable state, in case that said determination unit determines that said image formation request is issued from said external device while said activation unit activates both said operation unit and said image forming unit, wherein said control unit makes said image forming unit form the image by operating said first image processing function based on said image formation request from said operation unit, after said operation unit and said image forming unit have been brought into the usable state, in case that said determination unit determines that said image formation request is not issued from said external device while said activation unit activates both said operation unit and said image forming unit.

2. The image forming apparatus according to claim 1, wherein
   said image forming apparatus is connected to a network, and
   said determination unit is a print determination unit determining that a request issued through said network from a personal computer connected to said image forming apparatus is a request issued from said external device.

3. The image forming apparatus according to claim 1, wherein
   said image forming apparatus is connected to a telephone line, and
   said determination unit is a FAX reception determination unit determining that a request issued through said telephone line from a facsimile connected to said image forming apparatus is a request issued from said external device.

4. The image forming apparatus according to claim 1, wherein
   said image forming apparatus is connected to a telephone line, and
   said determination unit is a FAX transmission determination unit determining that a request issued through said telephone line to a facsimile connected to said image forming apparatus is a request issued from said operation unit.

5. The image forming apparatus according to claim 1, wherein
   said determination unit is a copy determination unit determining that a request to copy an image is a request issued from said operation unit.

6. The image forming apparatus according to claim 1, wherein
   said image forming unit includes a fixing device fixing the formed image on paper, and
   said control unit includes a detection unit detecting the completion of the activation of said image forming unit when the activation of said fixing device is completed.

7. The image forming apparatus according to claim 1, wherein
said operation unit displays a plurality of screens on which image forming conditions are set as said information.

8. An image forming system including an image forming apparatus that forms an image in response to a request and an external device making image formation requests to said image forming apparatus, said image forming apparatus comprising:
an operation unit configured to load a file, written in HTML format, from a hard disk, display information including multiple functions based on said loaded file in a usable state, and make image formation requests;
an image forming unit forming an image in response to an image formation request issued from said operation unit or said external device;
an activation unit for starting supplying electric power to both said operation unit and said image forming unit in parallel by turning on a main power, to activate said operation unit and said image forming unit to bring the units into the usable state, so that both a first image processing function which needs an operation with said operation unit, having at least a copy function, and a second image processing function which needs no operation with said operation unit, having a printer function, can be performed, wherein an activation time, representing time required from starting receiving electric power to the usable state, of said operation unit is longer than an activation time of said image forming unit on one or more occasions;
a determination unit determining, when said image formation request is issued while said activation unit activates both said operation unit and said image forming unit in parallel, after turning on said main power, whether said image formation request is issued from said external device or not; and
a control unit making said image forming unit form the image by operating said second image processing function, before said operation unit is brought into the usable state, based on said image formation request from said external device when said control unit detects that said image forming unit has been brought into the usable state, in case that said determination unit determines that said image formation request is issued from said external device while said activation unit activates both said operation unit and said image forming unit, wherein said control unit makes said image forming unit form the image by operating said first image processing function based on said image formation request from said operation unit, after said operation unit and said image forming unit have been brought into the usable state, in case that said determination unit determines that said image formation request is not issued from said external device while said activation unit activates both said operation unit and said image forming unit.

9. The image forming system according to claim 8, wherein
said external device is a computer connected to said image forming apparatus through a network.

10. The image forming system according to claim 8, wherein
said external device is a facsimile connected to said image forming apparatus through a telephone line.

11. A method for forming images with an image forming apparatus including an operation unit configured to load a file, written in HTML format, from a hard disk, display information including multiple functions based on said loaded file in a usable state, and make image formation requests and an image forming unit forming an image in response to an image formation request issued from said operation unit or an external device, said method comprising:
starting supplying electric power to both said operation unit and said image forming unit in parallel by turning on a main power, to activate said operation unit and said image forming unit to bring the units into the usable state, so that both a first image processing function which needs an operation with said operation unit, having at least a copy function, and a second image processing function which needs no operation with said operation unit, having a printer function, can be performed, wherein an activation time, representing time required from starting receiving electric power to the usable state, of said operation unit is longer than an activation time of said image forming unit on one or more occasions;
determining, when said image formation request is issued while both said operation unit and said image forming unit are being activated in parallel, after turning on said main power, whether the image formation request is issued from said external device on not; and
making said image forming unit form the image by operating said second image processing function, before said operation unit is brought into the usable state, based on said image formation request from said external device when a control unit detects that said image forming unit has been brought into the usable state, in case that it is determined that said image formation request is issued from said external device while both said operation unit and said image forming unit are being activated, wherein said control unit makes said image forming unit form the image by operating said first image processing function based on said image formation request from said operation unit, after said operation unit and said image forming unit have been brought into the usable state, in case that said determination unit determines that said image formation request is not issued from said external device while said activation unit activates both said operation unit and said image forming unit.

* * * * *